US008471840B2

(12) United States Patent
Iida et al.

(10) Patent No.: US 8,471,840 B2
(45) Date of Patent: Jun. 25, 2013

(54) DISPLAY, METHOD OF DRIVING DISPLAY, AND ELECTRONIC DEVICE

(75) Inventors: Yukihito Iida, Kanagawa (JP); Mitsuru Asano, Kanagawa (JP); Takayuki Taneda, Aichi (JP)

(73) Assignee: Sony Corporation, Tokyo (JP)

( * ) Notice: Subject to any disclaimer, the term of this patent is extended or adjusted under 35 U.S.C. 154(b) by 861 days.

(21) Appl. No.: 12/632,357

(22) Filed: Dec. 7, 2009

(65) Prior Publication Data

US 2010/0149166 A1 Jun. 17, 2010

(30) Foreign Application Priority Data

Dec. 11, 2008 (JP) ................................ 2008-315466

(51) Int. Cl.
*G06F 3/038* (2006.01)
*G09G 5/00* (2006.01)
*G09G 3/30* (2006.01)

(52) U.S. Cl.
USPC ............................................ 345/212; 345/76

(58) Field of Classification Search
None
See application file for complete search history.

(56) References Cited

U.S. PATENT DOCUMENTS

2008/0252626 A1* 10/2008 Iida et al. ...................... 345/204

FOREIGN PATENT DOCUMENTS

| | | |
|---|---|---|
| JP | 2006-133542 | 5/2006 |
| JP | 2007-310311 | 11/2007 |
| JP | 2008-222360 | 10/2008 |
| JP | 2008-257085 | 10/2008 |
| JP | 2008-262019 | 10/2008 |
| JP | 2010-055008 | 3/2010 |

OTHER PUBLICATIONS

Japanese Office Action for Japanese patent application No. 2008-315466 dated Nov. 27, 2012.

* cited by examiner

*Primary Examiner* — Joseph Haley
*Assistant Examiner* — Nicholas Lee
(74) *Attorney, Agent, or Firm* — Dentons US LLP

(57) ABSTRACT

A display includes a pixel array section having pixels in a matrix, each pixel including an electro-optical device, a writing transistor writing a video signal, a storage capacitor retaining the video signal, and a driving transistor driving the electro-optical device based upon the video signal; scan lines for respective rows of the unit providing a scanning signal to the writing transistor; power supply lines for respective rows of the unit selectively providing a first potential and a second potential, lower than the first potential, to a drain electrode of the driving transistor; and signal lines for respective columns of the unit selectively providing the video signal and a video signal reference potential to the writing transistor; wherein a potential setting period is provided from when the pixels are turned off until the first potential is provided to the power supply line.

5 Claims, 16 Drawing Sheets

BEFORE t = t1 t = t1 t = t2 t = t3 t = t4 t = t5 t = t6 t = t7 t = t8 t = t9 t = t10

DISPLAY, METHOD OF DRIVING DISPLAY, AND ELECTRONIC DEVICE

BACKGROUND OF THE INVENTION

1. Field of the Invention

The present invention relates to a display, a method of driving the display, and an electronic device. Specifically, it relates to a flat (flat panel type) display in which pixels each including an electro-optical device are arranged in a matrix, a method of driving the display, and an electronic device.

2. Description of the Related Art

In recent years, in the field of displays that display images, flat displays have rapidly become widespread, in which pixels (pixel circuits) including light emitting elements are arranged in a matrix. Flat displays, such as organic EL displays using an organic EL (Electro Luminescent) device, which utilizes the phenomenon of light emission upon application of an electric field to an organic thin film, have been developed, and are now being commercialized.

An organic EL device has low power consumption because it can be driven at a voltage of 10 V or less. Another feature is elimination of the use of a light source (backlight) commonly used in liquid crystal displays because the organic EL device is a self light emitting element. Further, since such an organic EL device responds very fast, its response rate being approximately several microseconds, afterimages during video display are not produced.

Similar to liquid crystal displays, an organic EL display can employ, as a driving scheme, a simple (passive) matrix scheme or an active matrix scheme. In recent years, displays utilizing an active matrix scheme have been actively developed in which active elements, such as insulated gate field effect transistors (generally, TFTs (Thin Film Transistors)), are placed in the pixel circuits.

In general, the I-V characteristics (current-voltage characteristics) of organic EL devices deteriorate as time passes (so-called deterioration over time). The threshold voltage Vth of a driving transistor and the mobility μ of a semiconductor thin film constituting a channel of a driving transistor (referred to below as mobility of a driving transistor) may change over time and vary per pixel due to variations in the manufacturing process.

In order to keep the light emission luminance of such an organic EL device constant without these influences, a configuration is employed so that each pixel circuit has a function compensating for variations in the characteristics of an organic EL device and correction functions of correcting variations in the threshold voltage Vth (referred to below as threshold correction) of a driving transistor and correcting variations in the mobility μ (referred to below as mobility correction) of a driving transistor (for example, refer to Japanese Unexamined Patent Application Publication No. 2006-133542).

SUMMARY OF THE INVENTION

In potential setting of pixel circuits in the related art, however, when a short occurs between the gate of a driving transistor and the anode in a pixel, not only the defective pixel becomes non-emission but also luminance variation areas in several previous pixels for transfer are visually recognized in a line. From the perspective of visibility, establishment of a standard for luminance variations in terms of the number of non-emission pixels in a display area is not allowed; particularly, a rise of luminance is not allowed even in one pixel.

Particularly if a short occurs in a display area, a problem arises in that it is visually recognized in a line.

It is desirable that, even in a case of an electrical short between the gate of a driving transistor and the anode in a pixel, the influence be confined so that only the defective pixel becomes non-emission and a luminance variation area is not visually recognized as a defect in a line.

An embodiment of the present invention is a display including: a pixel array section having pixels arranged in a matrix, each pixel including a circuit configuration in which an anode electrode of an organic EL (Electro Luminescent) device and a source electrode of a driving transistor are interconnected, a gate electrode of the driving transistor and a source electrode or a drain electrode of a writing transistor are interconnected, and a storage capacitor is connected between the gate and source electrodes of the driving transistor; scan lines wired for respective pixel rows of the pixel array section and providing a scanning signal to a gate electrode of the writing transistor; power supply lines wired for respective pixel rows of the pixel array section and selectively providing a first potential and a second potential lower than the first potential to a drain electrode of the driving transistor; and signal lines arranged for respective pixel columns of the pixel array section and selectively providing a video signal and a video signal reference potential to the drain electrode or the source electrode of the writing transistor; wherein a potential setting period is provided in which a potential provided to the power supply line is set at the video signal reference potential within a period from when the organic EL device of the pixels is turned off until the first potential is provided to the power supply line. Another embodiment is a method of driving a display, in which a potential setting period is provided within a period from when the turned-off state starts until the first potential is provided to the power supply line. Still another embodiment is an electronic device including such a display in a main body.

Since a potential provided to the power supply line is set at the video signal reference potential within a period from when the pixels are turned off until the first potential is provided to the power supply line in such embodiments of the present invention, the reference potential of the pixels in a front pixel row can be constant even in a case of an electrical short between the gate electrode of a driving transistor and the anode electrode in a pixel.

According to an embodiment of the present invention, even in a case of an electrical short between the gate electrode of a driving transistor and the anode electrode, it becomes possible to confine the influence so that only a defective pixel becomes non-emission and prevent a luminance variation area from being visually recognized in a line.

BRIEF DESCRIPTION OF THE DRAWINGS

FIG. 15A is a perspective view taken from the front and FIG. 15B is a perspective view taken from the back;

FIG. 18A is a front view in an open state, FIG. 18B is a side view thereof, FIG. 18C is a front view in an closed state, FIG. 18D is a left side view, FIG. 18E is a right side view, FIG. 18F is a top view, and FIG. 18G is a bottom view.

DESCRIPTION OF THE PREFERRED EMBODIMENTS

Preferred modes for carrying out the present invention (referred to below as embodiments) are described below. The description is given in the following order:

1. Display as a postulate of an embodiment of the present invention (system configuration, pixel circuit, circuit operation);
2. Problems in a case of a short between the gate and anode of a driving transistor (equivalent circuit, timing waveform diagram);
3. Configuration example of the present embodiment (pixel circuit, system configuration, driving method); and
4. Application examples (various application examples to electronic devices).

<1. Display as a Postulate of an Embodiment of the Present Invention>

[System Configuration]

Figure 1:
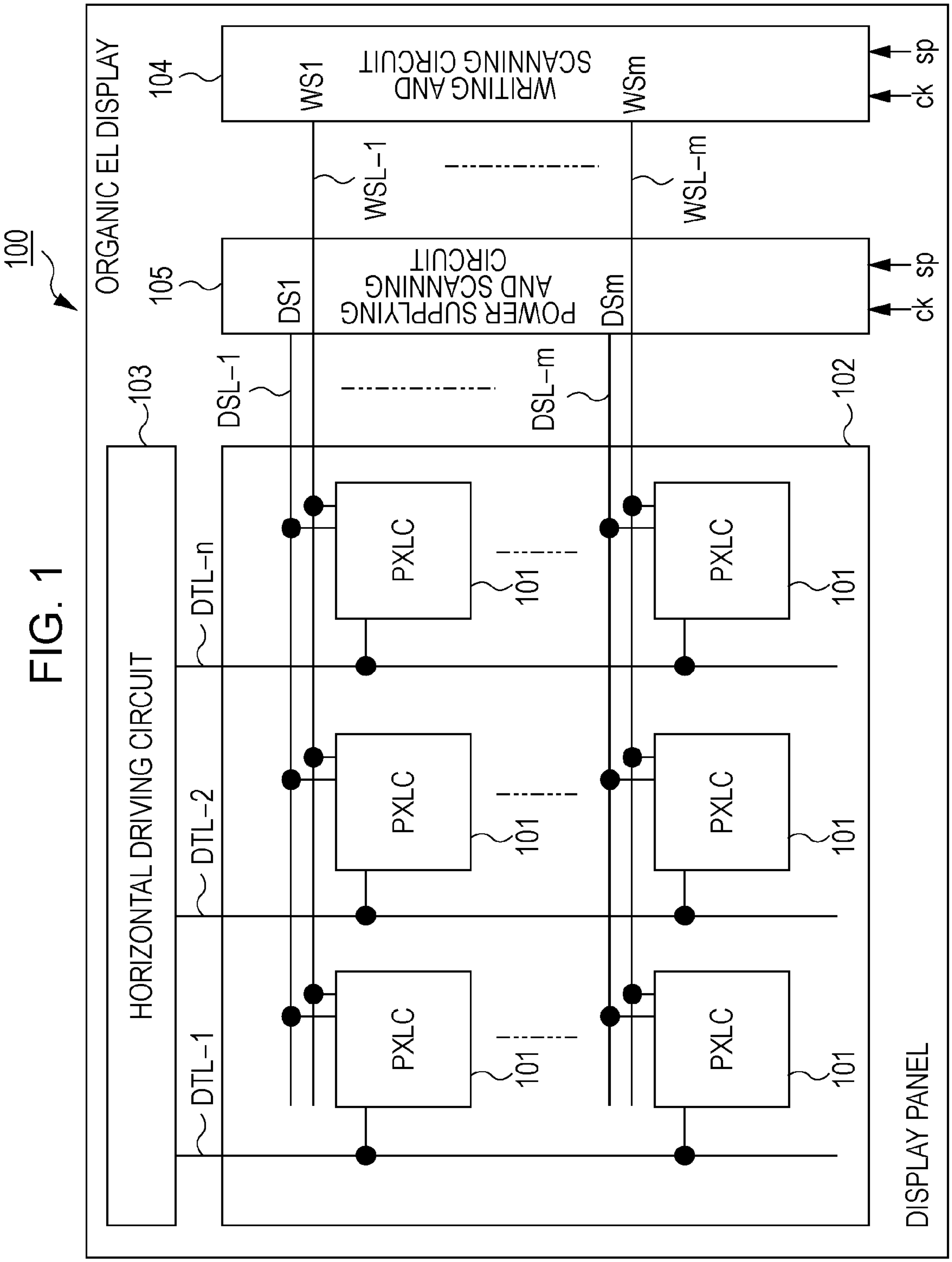
FIG. 1 schematically shows a configuration of an active matrix organic EL display as a postulate of an embodiment of the present invention.

FIG. 1 schematically shows a configuration of an active matrix display as a postulate of the present embodiment.

As an example, a description is given in an exemplary case of an active matrix organic EL display using a current driven electro-optical device, such as an organic EL device (an organic electroluminescent device) whose light emission luminance changes in response to the value of current flowing in the device, as a light emitting element of a pixel (pixel circuit).

As illustrated in FIG. 1, an organic EL display 100 is configured to have a pixel array section 102, in which pixels (PXLC) 101 are two dimensionally arranged in a matrix, and a driving unit that is arranged in the periphery of the pixel array section 102 and drives each pixel 101. As such a driving unit that drives the pixels 101, for example, a horizontal driving circuit 103, a writing and scanning circuit 104, and a power supplying and scanning circuit 105 are provided.

In the pixel array section 102, for a pixel array of m rows and n columns, scan lines WSL-1 through WSL-m and power supply lines DSL-1 through DSL-m are wired for respective pixel rows and signal lines DTL-1 through DTL-n are wired for respective pixel columns.

The pixel array section 102 is usually formed on a transparent insulating substrate, such as a glass substrate, and has a flat panel structure. Each pixel 101 of the pixel array section 102 can be formed using an amorphous silicon TFT (Thin Film Transistor) or a low-temperature polysilicon TFT. In a case of using a low-temperature polysilicon TFT, the horizontal driving circuit 103, the writing and scanning circuit 104, and the power supplying and scanning circuit 105 can also be implemented on a display panel (substrate) on which the pixel array section 102 is formed.

The writing and scanning circuit 104 is configured with a shift register or the like, which sequentially shifts (transfers) start pulses sp in synchronization with a clock pulse ck, and when writing a video signal to each pixel 101 of the pixel array section 102, write pulses (scanning signals) WS1 through WSm are sequentially supplied to the scan lines WSL-1 through WSL-m, thereby scanning (line sequential scanning) the pixels 101 of the pixel array section 102 in succession on a row-by-row basis.

The power supplying and scanning circuit 105 is configured with a shift register or the like, which sequentially shifts the start pulses sp in synchronization with the clock pulse ck. The power supplying and scanning circuit 105 selectively supplies power supply line potentials DS1 through DSm, which are switched at a first potential Vcc_H and a second potential Vcc_L, which is lower than the first potential Vcc_H, to the power supply lines DSL-1 through DSL-m in synchronization with the line sequential scanning by the writing and scanning circuit 104. In this way, the pixels 101 are controlled for light emission/non-emission.

The horizontal driving circuit 103 appropriately selects either one of a signal voltage (sometimes referred to below simply as a signal voltage) Vsig of a video signal that depends on luminance information supplied from a signal supply source (not shown) and a signal line reference potential Vo, and writes to the pixels 101 of the pixel array section 102 via the signal lines DTL-1 through DTL-n, for example, on a row-by-row basis. That is, the horizontal driving circuit 103 employs a driving mode of line sequential writing, in which a signal voltage Vsig of the video signal is written on a row-by-row (line-by-line) basis.

The signal line reference potential Vo is a voltage to be a reference for the signal voltage Vsig of a video signal (for example, a voltage equivalent to a level of black). The second potential Vcc_L is set at a potential lower than the signal line reference potential Vo, for example, a potential lower than Vo−Vth where the threshold voltage of a driving transistor is Vth, and preferably a potential sufficiently lower than Vo−Vth.

[Pixel Circuit]

Figure 2:
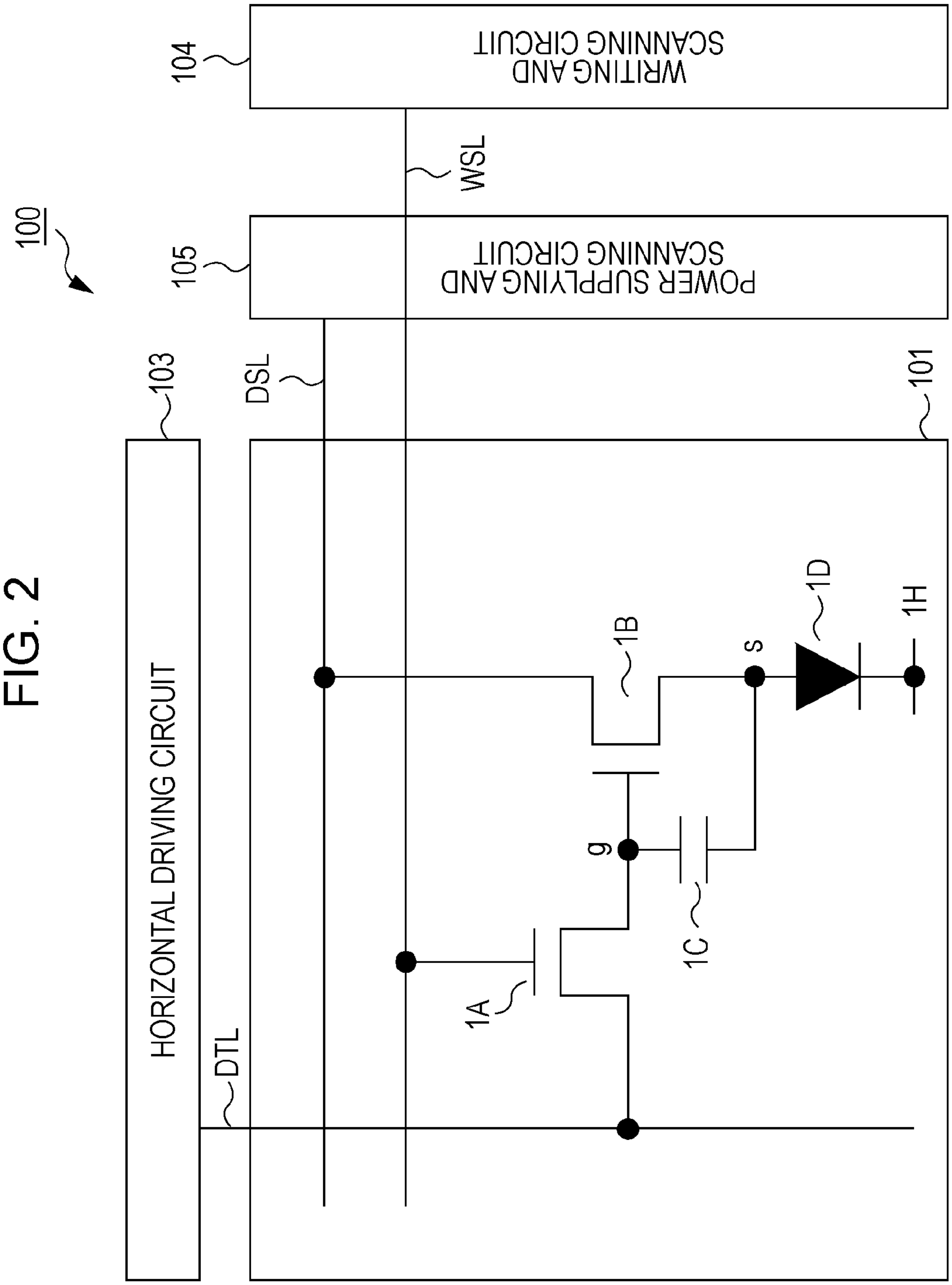
FIG. 2 is a circuit diagram illustrating a specific configuration of pixels (pixel circuits)

FIG. 2 is a circuit diagram illustrating a specific configuration of pixels (pixel circuits).

As illustrated in FIG. 2, the pixel 101 has a current driven electro-optical device, such as an organic EL device 1D, whose light emission luminance changes in response to the value of current flowing in the device as a light emitting element, and has a pixel configuration having a driving transistor 1B, a writing transistor 1A, and a storage capacitor 1C in addition to the organic EL device 1D, that is, a pixel configuration of 2Tr/1C including two transistors (Tr) and one capacitive element (C).

In the pixel 101 having such a configuration, N channel TFTs are used as the driving transistor 1B and the writing transistor 1A. However, this combination of conductivity types of the driving transistor 1B and the writing transistor 1A is just an example, and it is not limited to this combination.

The organic EL device 1D has a cathode electrode connected to a common power supply line 1H, which is commonly wired to all of the pixels 101. The driving transistor 1B has a source electrode connected to an anode electrode of the organic EL device 1D and a drain electrode connected to the power supply line DSL (DSL-1 through DSL-m).

The writing transistor 1A has a gate electrode connected to the scan line WSL (WSL-1 through WSL-m), and one of two other electrodes (source electrode or drain electrode) is connected to the signal line DTL (DTL-1 through DTL-n) and the other electrode (drain electrode or source electrode) is connected to a gate electrode of the driving transistor 1B.

One of the electrodes of the storage capacitor 1C is connected to the gate electrode of the driving transistor 1B, and the other electrode is connected to the source electrode of the driving transistor 1B (the anode electrode of the organic EL device 1D).

In the pixel 101 having a configuration of 2Tr/1C, the writing transistor 1A becomes conductive in response to the scanning signal WS applied to the gate electrode through the scan line WSL from the writing and scanning circuit 104, thereby writing the signal voltage Vin of the video signal that depends on the luminance information supplied through the signal line DTL from the horizontal driving circuit 103 or the signal line reference potential Vo into the pixel 101 by sampling.

The written signal voltage Vin or signal line reference potential Vo is applied to the gate electrode of the driving transistor 1B, and is also retained in the storage capacitor 1C. When the potential DS of the power supply line DSL (DSL-1 through DSL-m) is at the first potential Vcc_H, the driving transistor 1B is supplied a current from the power supply line DSL and supplies a driving current at the current value that depends on the value of voltage of the signal voltage Vin retained in the storage capacitor 1C to the organic EL device 1D, thereby causing the organic EL device 1D emit light by current driving.

[Circuit Operation of Organic EL Display]

Figure 3:
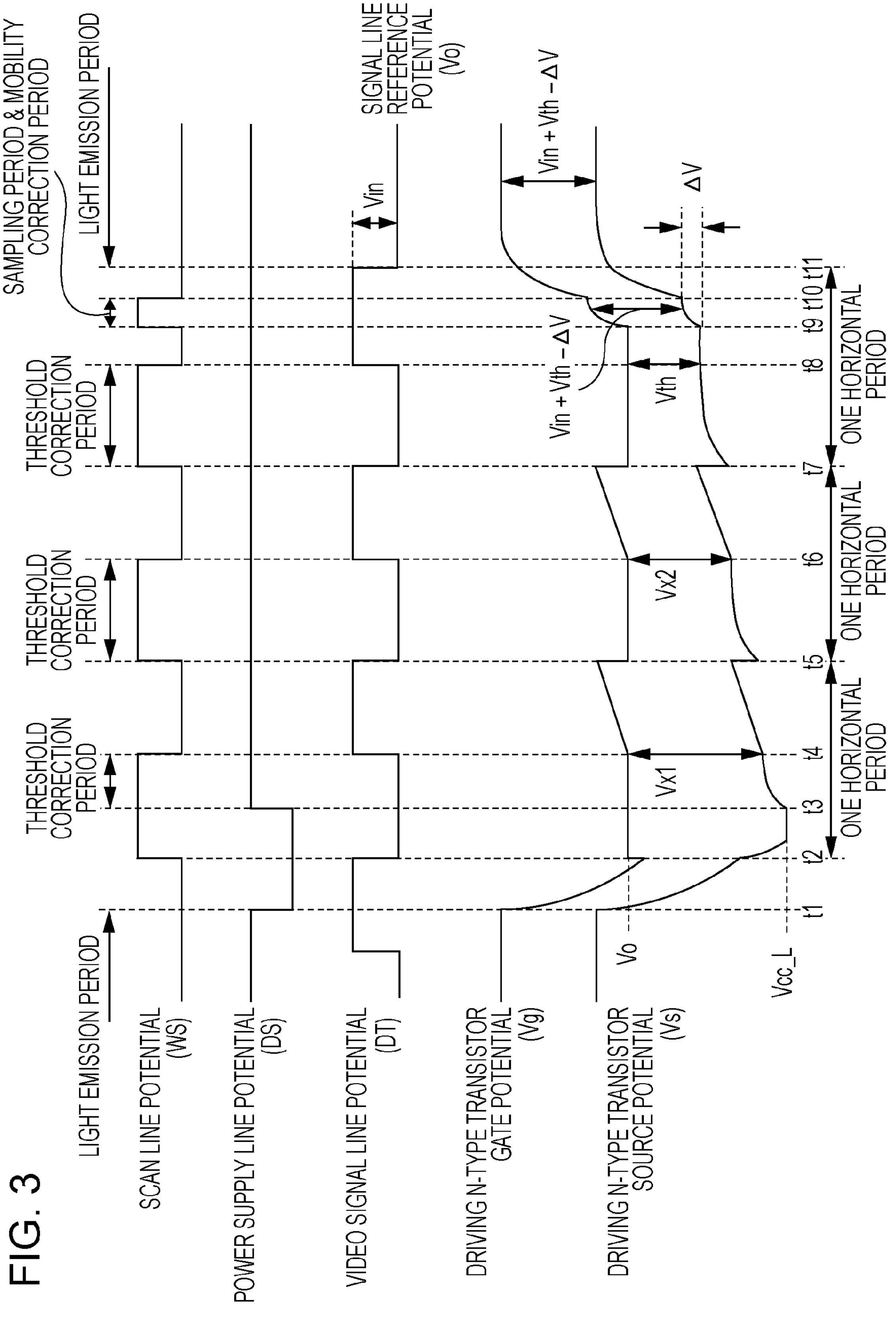
FIG. 3 is a timing waveform diagram served for operation description of an active matrix organic EL display as a postulate of the embodiment of the present invention.

Next, the circuit operation of the organic EL display 100 having the above configuration is described based on the timing waveform diagram in FIG. 3 and using the operation description diagrams in FIGS. 4A to 6C. In the operation description diagrams in FIGS. 4A to 6C, the writing transistor 1A is illustrated as a switch symbol to simplify the drawings. Since the organic EL device 1D has a capacitor 1I, the EL capacitor 1I is also illustrated.

The timing waveform diagram in FIG. 3 represents the changes in the potential (write pulse) WS of the scan line WSL (WSL-1 through WSL-m), the changes in the potential DS (Vcc_H/Vcc_L) of the power supply line DSL (DSL-1 through DSL-m), and the changes in a gate potential Vg and a source potential Vs of the driving transistor 1B.

(Light Emission Period)

In the timing waveform diagram in FIG. 3, before a time t1, the organic EL device 1D is in the state of light emission (light emission period). In the light emission period, the potential DS of the power supply line DSL is at the first potential Vcc_H and the writing transistor 1A is not conductive.

Figure 4A:
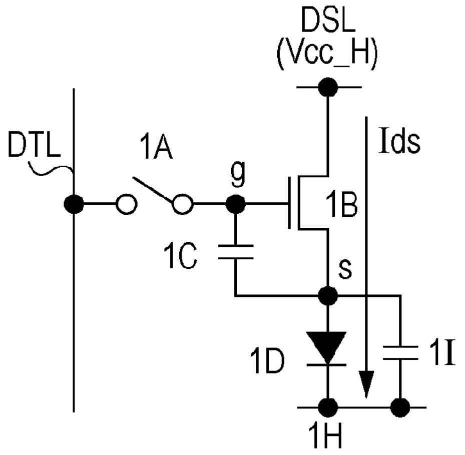
FIGS. 4A to 4D are illustrative diagrams (1) of the circuit operation of an active matrix organic EL display as a postulate of the embodiment of the present invention.

Since the driving transistor 1B is set to operate in the saturation region, a driving current (drain-source current) Ids that depends on a gate-source voltage Vgs of the driving transistor 1B is supplied from the power supply line DSL through the driving transistor 1B to the organic EL device 1D as illustrated in FIG. 4A. The organic EL device 1D thus emits light with a luminance that depends on the current value of the driving current Ids.

(Threshold Correction Period)

Figure 4B:
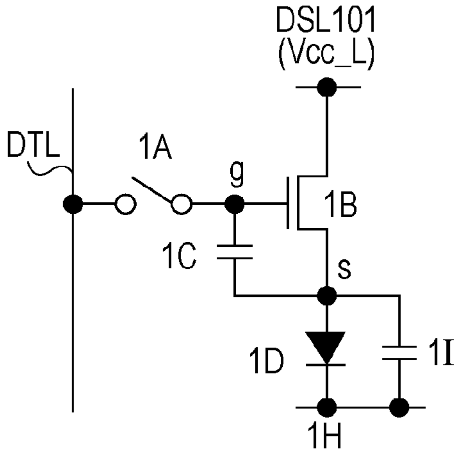

At the time t1, a new field of line sequential scanning starts, and as illustrated in FIG. 4B, the potential DS of the power supply line DSL is switched from the first potential (referred to below as high potential) Vcc_H to the second potential (referred to below as low potential) Vcc_L, which is sufficiently lower than the signal line reference potential Vo−Vth of the signal line DTL.

A threshold voltage of the organic EL device 1D is denoted by Vel and a potential of the common power supply line 1H is denoted by Vcath, and when the low potential Vcc_L<Vel+Vcath, the source potential Vs of the driving transistor 1B becomes nearly equal to the low potential Vcc_L, so the organic EL device 1D becomes reverse biased to turn off the light.

Figure 4C:
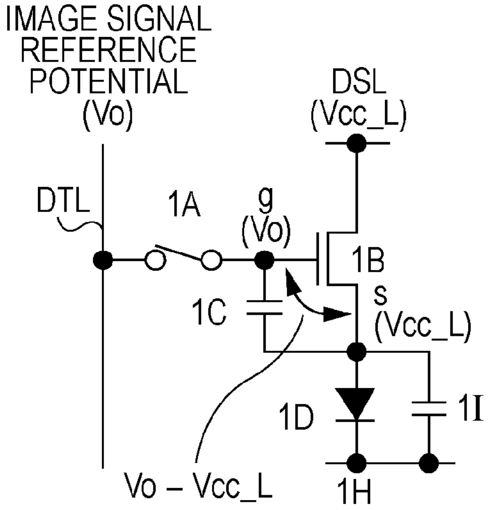

Then, since the potential WS of the scan line WSL transits from the low potential to the high potential at a time t2, the writing transistor 1A becomes conductive as illustrated in FIG. 4C. At this point, since the signal line reference potential Vo is supplied from the horizontal driving circuit 103 to the signal line DTL, the gate potential Vg of the driving transistor 1B is at the signal line reference potential Vo. The source potential Vs of the driving transistor 1B is at the potential Vcc_L, which is sufficiently lower than the signal line reference potential Vo.

The gate-source voltage Vgs of the driving transistor 1B becomes Vo−Vcc_L. Here, since a threshold correction operation described later becomes difficult unless the Vo−Vcc_L is larger than the threshold voltage Vth of the driving transistor 1B, it is desirable to set the potentials in the relationship of Vo−Vcc_L>Vth. In such a manner, the operation of fixing (determining) the gate potential Vg and the source potential Vs of the driving transistor 1B respectively as the signal line reference potential Vo and as the low potential Vcc_L for initialization is the operation of threshold correction preparation.

(First Threshold Correction Period)

Figure 4D:
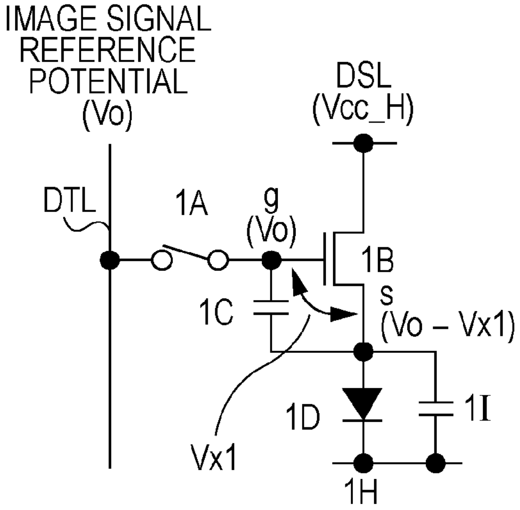

Then, when the potential DS of the power supply line DSL is switched from the low potential Vcc_L to the high potential Vcc_H at a time t3 as illustrated in FIG. 4D, the source potential Vs of the driving transistor 1B starts increasing and the first threshold correction period starts. In the first threshold correction period, the increase in the source potential Vs of the driving transistor 1B causes the gate-source voltage Vgs of the driving transistor 1B to be a predetermined potential Vx1 and the potential Vx1 is retained in the storage capacitor 1C.

Figure 5A:
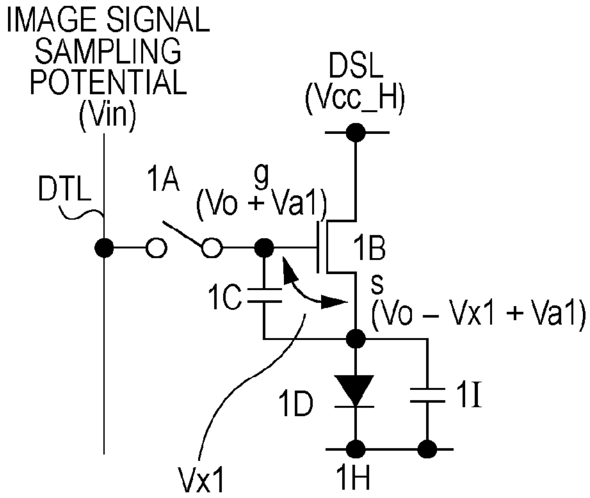
FIGS. 5A to 5D are illustrative diagrams (2) of the circuit operation of an active matrix organic EL display as a postulate of the embodiment of the present invention.

Subsequently, at a time t4 when the last half of a horizontal period starts, as illustrated in FIG. 5A, the signal voltage Vin of the video signal is supplied from the horizontal driving circuit 103 to the signal line DTL, thereby transiting the potential of the signal line DTL from the signal line reference potential Vo to the signal voltage Vin. During this period, the signal voltage Vin is written in the pixels in another row.

In order not to write the signal voltage Vin in the pixels in the row currently being explained, the potential WS of the scan line WSL is transited from the high potential to the low potential to let the writing transistor 1A be not conductive. In this way, the gate electrode of the driving transistor 1B is separated from the signal line DTL to be in a state of floating.

When the gate electrode of the driving transistor 1B is in the state of floating, the storage capacitor 1C is connected between the gate and the source of the driving transistor 1B, thereby, as the source potential Vs of the driving transistor 1B varies, the gate potential Vg of the driving transistor 1B also varies in conjunction with (following) the variation of the source potential Vs. This is a bootstrap operation performed by the storage capacitor 1C.

After the time t4, the source potential Vs of the driving transistor 1B also continues to increase and the increase becomes Va1 (Vs=Vo−Vx1+Va1). At this point, due to the bootstrap operation, the gate potential Vg also increases by Va1 in conjunction with the increase in the source potential Vs of the driving transistor 1B (Vg=Vo+Va1).

(Second Threshold Correction Period)

Figure 5B:
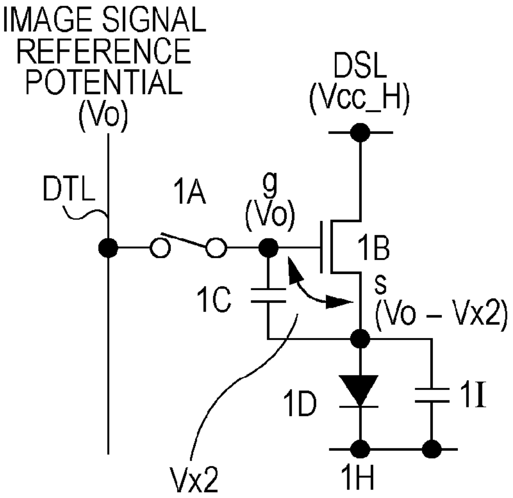

A next horizontal period starts at a time t5, and as illustrated in FIG. 5B, at the same time of transition of the potential WS of the scan line WSL from the low potential to the high potential to let the writing transistor 1A be conductive, the signal line reference potential Vo is supplied, instead of the signal voltage Vin, from the horizontal driving circuit 103 to the signal line DTL and the second threshold correction period starts.

In the second threshold correction period, since the signal line reference potential Vo is written by letting the writing transistor 1A be conductive, the gate potential Vg of the driving transistor 1B is initialized again at the signal line reference potential Vo. The source potential Vs also decreases in conjunction with the decrease in the gate potential Vg at this point. Then again, the source potential Vs of the driving transistor 1B starts increasing.

The source potential Vs of the driving transistor 1B increases in the second threshold correction period, thereby the gate-source voltage Vgs of the driving transistor 1B becomes a predetermined potential Vx2 and the potential Vx2 is retained in the storage capacitor 1C.

Figure 5C:
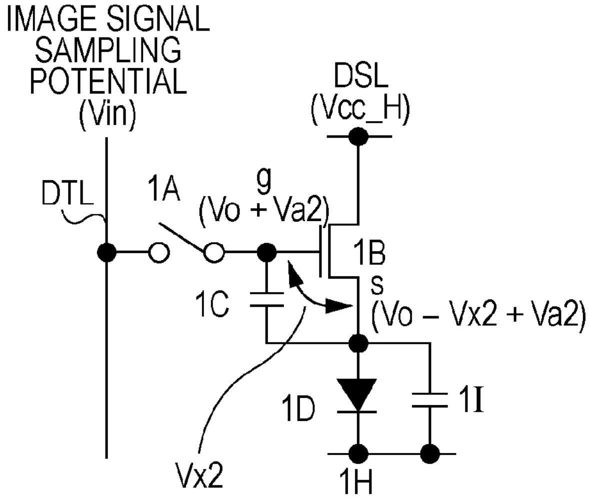

Subsequently, at a time t6 when the last half of this horizontal period starts, as illustrated in FIG. 5C, the signal voltage Vin of the video signal is supplied from the horizontal driving circuit 103 to the signal line DTL, thereby transiting a potential DT of the signal line DTL from the signal line reference potential Vo to the signal voltage Vin. During this period, the signal voltage Vin is written in the pixels in another row (a row next to the row written in the previous time).

In this case, in order not to write the signal voltage Vin in the pixels in the row currently being explained, the potential WS of the scan line WSL is transited from the high potential to the low potential to let the writing transistor 1A be not conductive. In this way, the gate electrode of the driving transistor 1B is separated from the signal line DTL to be in a state of floating.

After the time t6, the source potential Vs of the driving transistor 1B also continues to increase and the increase becomes Va2 (Vs=Vo−Vx2+Va2). At this point, due to the bootstrap operation, the gate potential Vg also increases by Va2 in conjunction with the increase in the source potential Vs of the driving transistor 1B (Vg=Vo+Va2).

(Third Threshold Correction Period)

Figure 5D:
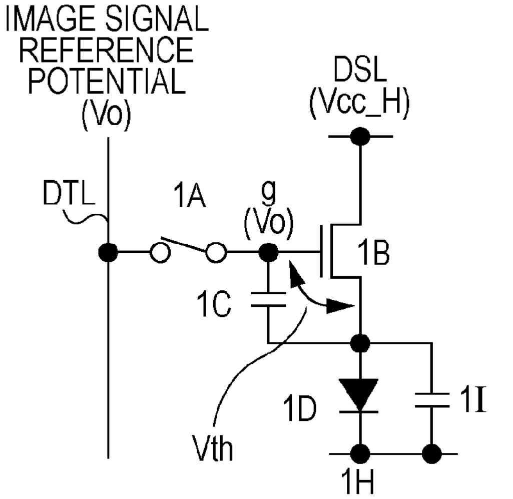

A next horizontal period starts at a time t7, and as illustrated in FIG. 5D, at the same time of transition of the potential WS of the scan line WSL from the low potential to the high potential to let the writing transistor 1A be conductive, the signal line reference potential Vo is supplied, instead of the signal voltage Vin, from the horizontal driving circuit 103 to the signal line DTL and the third threshold correction period starts.

In the third threshold correction period, since the signal line reference potential Vo is written by letting the writing transistor 1A be conductive, the gate potential Vg of the driving transistor 1B is initialized again at the signal line reference potential Vo. The source potential Vs also decreases in conjunction with the decrease in the gate potential Vg at this point. Then again, the source potential Vs of the driving transistor 1B starts increasing.

The source potential Vs of the driving transistor 1B increases and the gate-source voltage Vgs of the driving transistor 1B is converged on the threshold voltage Vth of the driving transistor 1B, thereby a voltage equivalent to the threshold voltage Vth is retained in the storage capacitor 1C.

By the three threshold correction operations described above, the threshold voltage Vth of the driving transistor 1B of the individual pixels is detected and a voltage equivalent to the threshold voltage Vth is retained in the storage capacitor 1C. In the three threshold correction periods, in order that the current flows only in the storage capacitor 1C but not in the organic EL device 1D, the potential Vcath of the common power supply line 1H is set so that the organic EL device 1D is in the state of cutoff.

(Signal Writing Period & Mobility Correction Period)

Figure 6A:
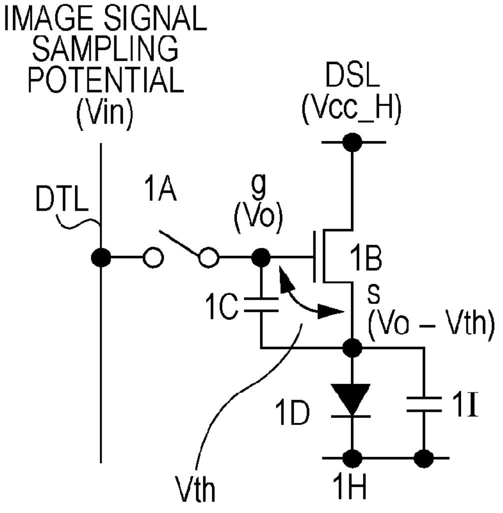
FIGS. 6A to 6C are illustrative diagrams (3) of the circuit operation of an active matrix organic EL display as a postulate of the embodiment of the present invention.

Then, since the potential WS of the scan line WSL transits to the low potential at a time t8, as illustrated in FIG. 6A, the writing transistor 1A becomes not conductive and at the same time the potential DT of the signal line DTL is switched from the signal line reference potential Vo to the signal voltage Vin of the video signal.

Since the writing transistor 1A becomes not conductive, the gate electrode of the driving transistor 1B becomes floating, while the driving transistor 1B is cutoff because the gate-source voltage Vgs is equal to the threshold voltage Vth of the driving transistor 1B. Therefore, the drain-source current Ids does not flow in the driving transistor 1B.

Figure 6B:
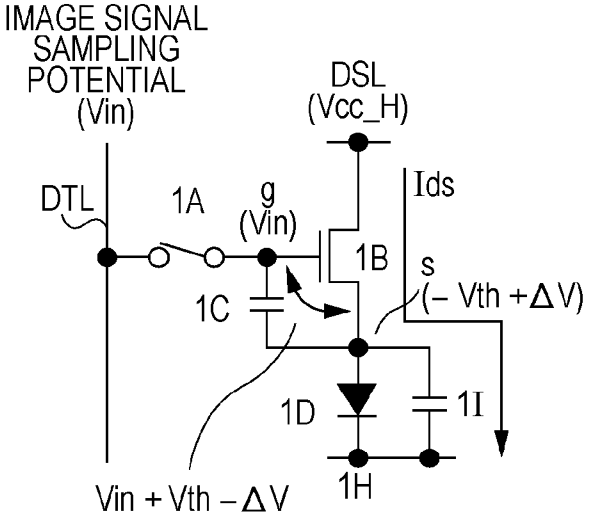

Subsequently, since the potential WS of the scan line WSL transits to the high potential at a time t9, as illustrated in FIG. 6B, the writing transistor 1A becomes conductive and writes the signal voltage Vin of the video signal in the pixel 101 by sampling. The writing of the signal voltage Vin by the writing transistor 1A causes the gate potential Vg of the driving transistor 1B to be at the signal voltage Vin.

When driving the driving transistor 1B by the signal voltage Vin of the video signal, the threshold voltage Vth of the driving transistor 1B and a voltage equivalent to the threshold voltage Vth retained in the storage capacitor 1C are cancelled, thereby threshold correction is carried out. The fundamentals of threshold correction are described later.

Since the organic EL device 1D is initially in the state of cutoff (high impedance state), the current (drain-source current Ids) flowing in the driving transistor 1B from the power supply line DSL in response to the signal voltage Vin of the video signal flows in the EL capacitor 1I of the organic EL device 1D and thus charging of the EL capacitor 1I starts.

Due to the charging of the EL capacitor 1I, the source potential Vs of the driving transistor 1B increases as time passes. At this point, the variation in the threshold voltage Vth of the driving transistor 1B has already corrected (threshold correction) and the drain-source current Ids of the driving transistor 1B depends on the mobility $\mu$ of the driving transistor 1B.

Finally when the source potential Vs of the driving transistor 1B increases to a potential of Vo−Vth+ΔV, the gate-source voltage Vgs of the driving transistor 1B becomes Vin+Vth−

ΔV. That is, the increase ΔV in the source potential Vs acts to be subtracted from the voltage (Vin+Vth−ΔV) retained in the storage capacitor 1C, in other words to discharge the charged electrical charge of the storage capacitor 1C, which turns out as to be subjected to negative feedback. The amount ΔV of the increase in the source potential Vs therefore becomes an amount of the negative feedback.

In such a manner, the drain-source current Ids flowing in the driving transistor 1B is subjected to negative feedback to a gate input of the driving transistor 1B, i.e., the gate-source voltage Vgs, thereby eliminating the dependency of the drain-source current Ids of the driving transistor 1B to the mobility μ, i.e., carrying out mobility correction in which the variation in the mobility μ per pixel is corrected.

More specifically, the higher the signal voltage Vin of the video signal is, the larger the drain-source current Ids becomes, so the absolute value of the amount ΔV of negative feedback (correction amount) also becomes larger. Therefore, mobility correction is carried out according to the level of light emission luminance. In a case that the signal voltage Vin of the video signal is constant, the larger the mobility μ of the driving transistor 1B is, the larger the absolute value of the amount ΔV of negative feedback becomes, so the variation in the mobility μ per pixel can be eliminated. The fundamentals of mobility correction are described later.

(Light Emission Period)

Figure 6C:
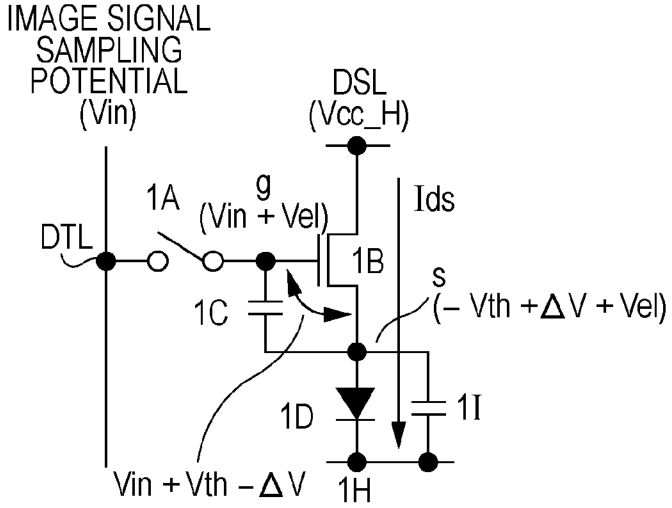

Then, since the potential WS of the scan line WSL transits to the low potential at a time t10, as illustrated in FIG. 6C, the writing transistor 1A becomes not conductive. In this way, the gate electrode of the driving transistor 1B is separated from the signal line DTL to be in the state of floating.

The gate electrode of the driving transistor 1B becomes floating, and at the same time, the drain-source current Ids of the driving transistor 1B starts flowing in the organic EL device 1D, thereby the anode potential of the organic EL device 1D increases in response to the drain-source current Ids of the driving transistor 1B.

An increase in the anode potential of the organic EL device 1D is the very increase in the source potential Vs of the driving transistor 1B itself. In conjunction with an increase in the source potential Vs of the driving transistor 1B, the gate potential Vg of the driving transistor 1B also increases due to the bootstrap operation of the storage capacitor 1C.

At this point, in a case of assuming that a bootstrap gain is 1 (ideal value), the amount of increase in the gate potential Vg becomes equal to the amount of increase in the source potential Vs. The gate-source voltage Vgs of the driving transistor 1B is therefore retained constantly at Vin+Vth−ΔV during the light emission period. The potential DT of the signal line DTL is switched from the signal voltage Vin of the video signal to the signal line reference potential Vo at a time t11.

As clearly understood from the operation description above, in the present example, the threshold correction period is provided over a total of three periods (one period to carry out signal writing and mobility correction and two periods precedent to the one period). In this way, a sufficient length of time is kept as the threshold correction period, so it is possible to certainly detect the threshold voltage Vth of the driving transistor 1B and retain the voltage in the storage capacitor 1C and the threshold correction operation can be carried out certainly.

Although the threshold correction period is described as being provided over the three periods, this is just an example and it is not suggested to set the threshold correction period over the precedent horizontal periods as long as a sufficient length of time can be kept as the threshold correction period by the one period to carry out signal writing and mobility correction, and it is also possible to set the threshold correction period over four or more periods if it is difficult to keep a sufficient length of time even by providing the threshold correction period over three periods because one period becomes short for higher resolution.

(A Case of Providing Positive Bias Period and Threshold Correction Preparation Period)

Figure 7:
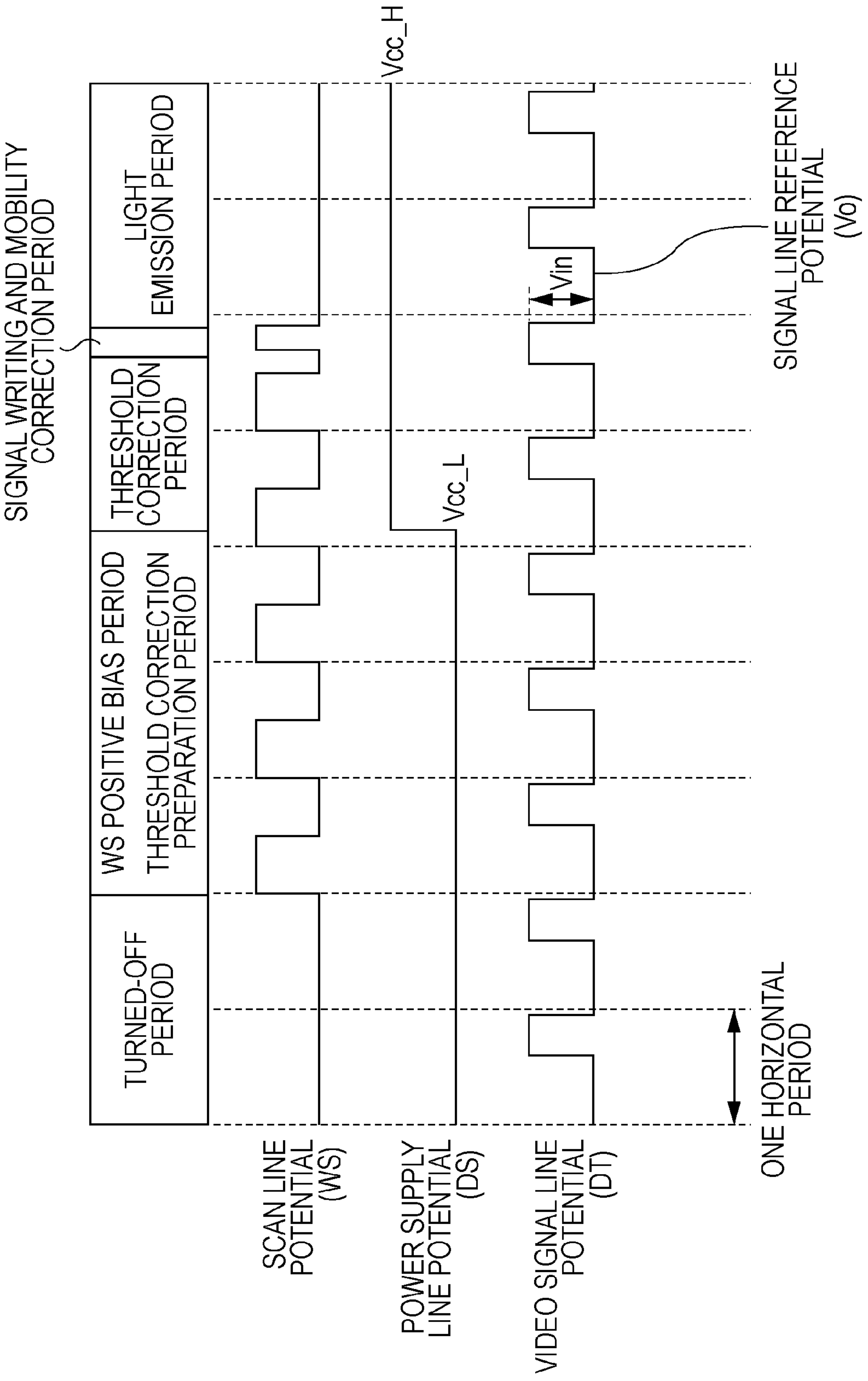
FIG. 7 is a timing waveform diagram illustrating a positive bias period and a threshold correction preparation period.

FIG. 7 is a timing waveform diagram illustrating a positive bias period and a threshold correction preparation period. The positive bias period and the threshold correction preparation period are provided immediately before the threshold correction period (times t3 to t4) relative to the timings illustrated in FIG. 3, and the writing transistor 1A is positively biased. Here, the period while the power supply line DSL transits to the low potential becomes a non-emission (turned-off) period for the organic EL device 1D and enables to adjust the light emission period.

In the threshold correction preparation period, when the writing transistor 1A is positively biased, since the signal line reference potential Vo is supplied to the signal line DTL, the gate potential Vg of the driving transistor 1B becomes at the signal line reference potential Vo. Since the potential Vcc_L, which is sufficiently lower than the signal line reference potential Vo is applied to the power supply line DSL, the source potential Vs of the driving transistor 1B becomes at the potential Vcc_L. In such a manner, in the threshold correction preparation period, the gate potential Vg and the source potential Vs of the driving transistor 1B are respectively fixed at the signal line reference potential Vo and the low potential Vcc_L for initialization.

<2. Problems in a Case of a Short Between the Gate and Anode of a Driving Transistor>

[Equivalent Circuit]

Figure 8A:
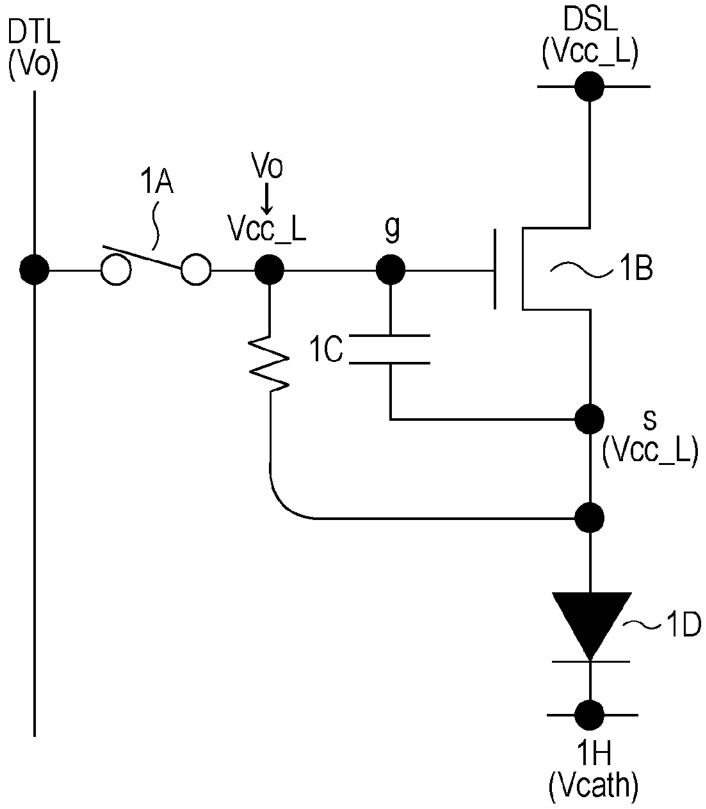
FIGS. 8A and 8B are diagrams illustrating the influence of a short circuit of a driving transistor.

FIG. 8A illustrates an equivalent circuit in a case that, in the pixel circuit illustrated in FIG. 2, a gate g of the driving transistor 1B and an anode s (the source of the driving transistor 1B) are electrically shorted. In terms of the operation, the state in FIG. 4C is cited as an example. That is, in this state, since the power supply line DSL transits to the low potential Vcc_L, the potential of the anode s of the organic EL device 1D is also at Vcc_L.

While the gate g of the driving transistor 1B and the anode s of the organic EL device 1D are shorted, if the writing transistor 1A is turned on, the video signal line DTL, the gate g of the driving transistor 1B, and the anode s become conductive. Accordingly, the video signal reference potential Vo supplied to the video signal line DTL is drawn into the anode potential Vcc_L.

Figure 8B:
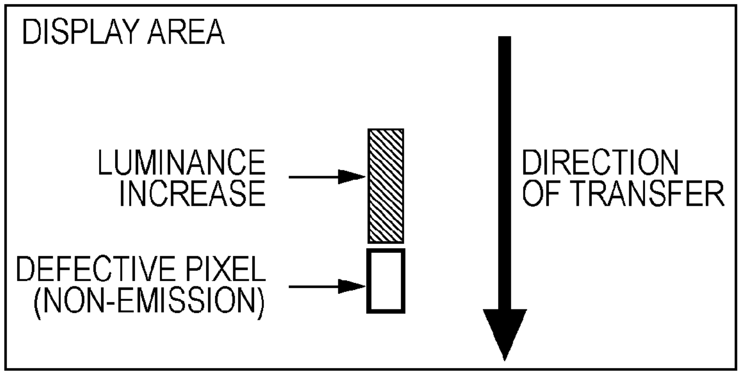

FIG. 8B is a diagram illustrating the state of display when the short circuit illustrated in FIG. 8A occurs. A defective pixel, that is the pixel in which the gate g of the driving transistor 1B and the anode s are electrically shorted as illustrated in FIG. 8A, becomes non-emission. Further, several previous pixels for transfer form a luminance variation area. A luminance increase area depends on the direction of transfer and is typically produced in the several previous pixels for transfer.

[Timing Waveform Diagram]

Figure 9:
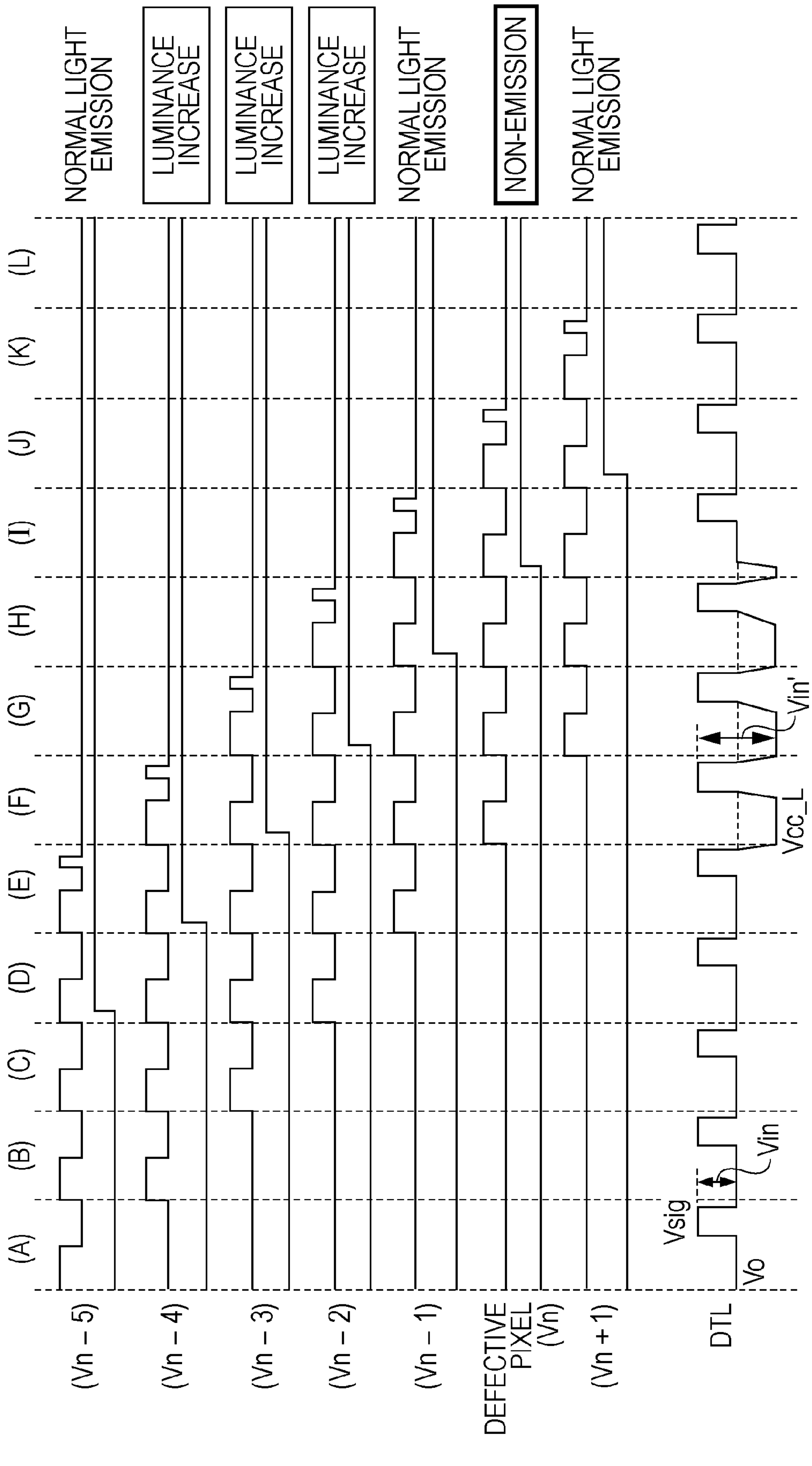
FIG. 9 is a timing waveform diagram when a defect occurs.

FIG. 9 is a timing waveform diagram when the defect in FIG. 8A occurs. Based upon the concept of threshold correction, the low potential Vcc_L of the power supply line DSL is set at a potential at most lower than the threshold Vth of the driving transistor 1B relative to the video signal reference potential Vo. In the present timing waveform diagram, Vn−5 through Vn+1 respectively illustrate the timings of the scan lines (upper line) and the power supply line potentials (lower line) for respective scanning line numbers. The defective pixel is equivalent to Vn. DTL illustrates the video signal potential.

As illustrated in FIG. 9, the power supply line DSL of the defective pixel Vn transits to the low potential during the periods of from (F) to (I), and as the scan line WSL also transits to the high potential, the potential supplied to the video signal line DTL is drawn into the anode potential Vcc_L.

As a result, in the pixels Vn-4 through Vn-2, since the video signal reference potential Vo immediately before sampling the video signal potential is drawn into Vcc_L, the input amplitude to the gate g of the driving transistor 1B becomes, not Vin=Vsig−Vo, but Vin'=Vsig−Vcc_L.

Since Vo>Vcc_L, a high amplitude is written equivalently in the pixels Vn-4 through Vn-2. Therefore, Vn-4 through Vn-2 cause an increase in luminance and are visually recognized as a luminance increase area in a line. Regarding the defective pixel Vn, since the gate g and the anode s of the driving transistor 1B becomes at a same potential, the gate-source voltage Vgs becomes 0 V and no current flows to be non-emission.

<3. Configuration Example of the Present Embodiment>

[Pixel Circuit]

Figure 10:
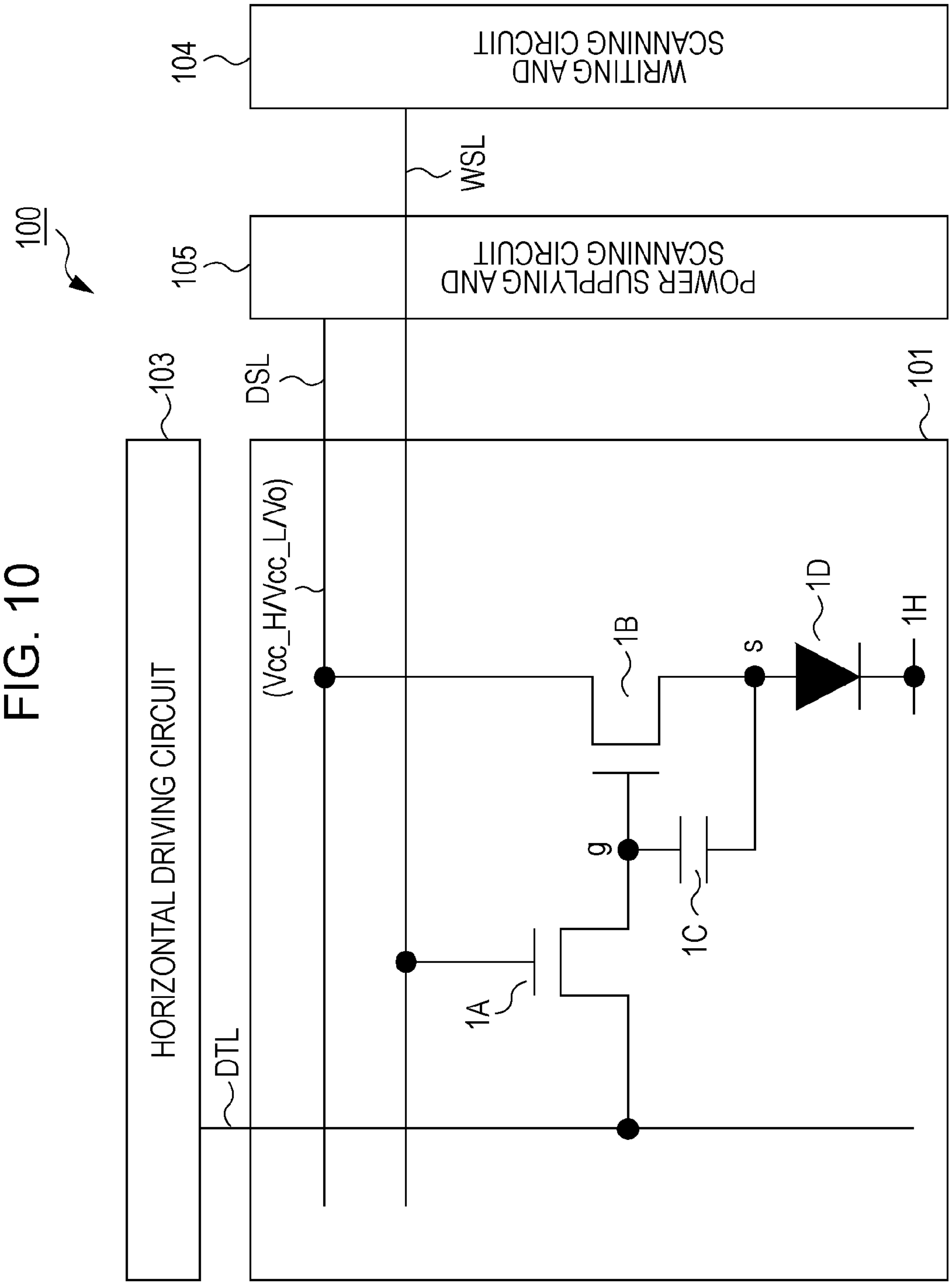
FIG. 10 is a circuit diagram of a pixel illustrating an example of the present embodiment.

FIG. 10 is a circuit diagram of a pixel illustrating an example of the present embodiment. A pixel circuit has the organic EL device 1D, the driving transistor 1B, the writing transistor 1A, and the storage capacitor 1C.

Specifically, an anode electrode of the organic EL device 1D and a source electrode of the driving transistor 1B are interconnected, and a gate electrode of the driving transistor 1B and a source electrode or a drain electrode of the writing transistor 1A are interconnected. The storage capacitor 1C is connected between the gate and source electrodes of the driving transistor 1B.

The signal line DTL is connected to the drain electrode or a source electrode of the writing transistor 1A. A gate electrode of the writing transistor 1A is connected to a scan line not shown and a predetermined timing is given. The power supply line DSL is connected to a drain electrode of the driving transistor 1B.

In such a configuration of the pixel circuit, the present embodiment provides a potential setting period in which a potential provided to the power supply line DSL is set at the video signal reference potential Vo within a period from when the organic EL device 1D is turned off until the high potential Vcc_H is provided to the power supply line DSL. In this way, even in the periods of from (F) to (I) in FIG. 9, a potential supplied to the video signal line DTL is not drawn into the anode potential Vcc_L, and it becomes possible to prevent the production of a luminance variation area with the previous pixels.

[System Configuration]

Figure 11:
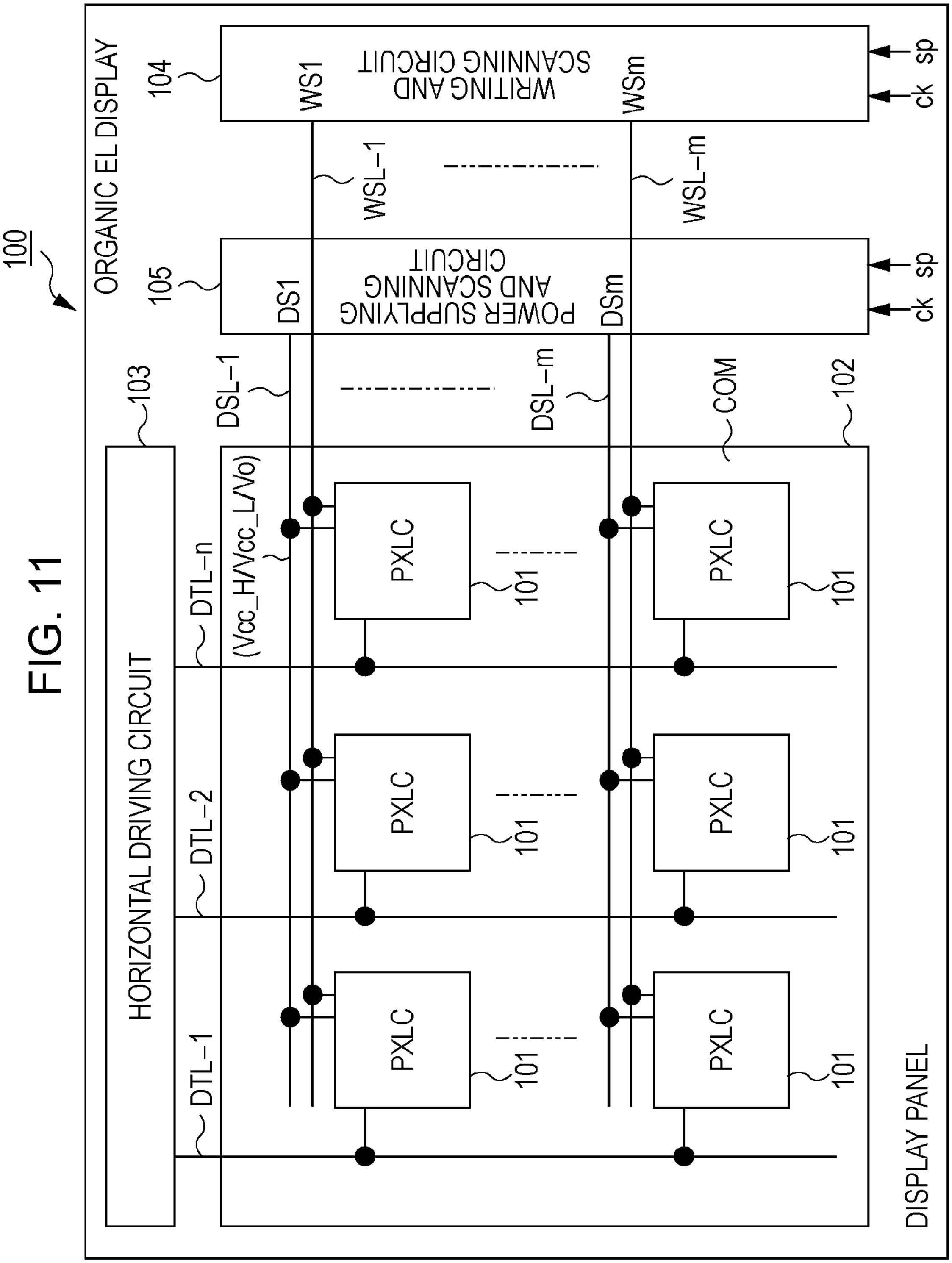
FIG. 11 is a system configuration diagram illustrating an example of the present embodiment.

FIG. 11 is a system configuration diagram illustrating an example of the present embodiment. As illustrated in FIG. 11, the organic EL display 100 is configured to have the pixel array section 102, in which the pixels (PXLC) 101 are two dimensionally arranged in a matrix, and a driving unit that is arranged in the periphery of the pixel array section 102 and drives each pixel 101. As such a driving unit that drives the pixels 101, for example, the horizontal driving circuit 103, the writing and scanning circuit 104, and the power supplying and scanning circuit 105 are provided.

In the pixel array section 102, for a pixel array of m rows and n columns, the scan lines WSL-1 through WSL-m and the power supply lines DSL-1 through DSL-m are wired for respective pixel rows and the signal lines DTL-1 through DTL-n are wired for respective pixel columns.

The writing and scanning circuit 104 is configured with a shift register or the like, which sequentially shifts (transfers) the start pulses sp in synchronization with the clock pulse ck, and when writing a video signal to each pixel 101 of the pixel array section 102, the write pulses (scanning signals) WS1 through WSm are sequentially supplied to the scan lines WSL-1 through WSL-m, thereby scanning (line sequential scanning) the pixels 101 of the pixel array section 102 in succession on a row-by-row basis.

The power supplying and scanning circuit 105 is configured with a shift register or the like, which sequentially shifts the start pulses sp in synchronization with the clock pulse ck. The power supplying and scanning circuit 105 selectively supplies the power supply line potentials DS1 through DSm, which are switched at the first potential Vcc_H and the second potential Vcc_L, which is lower than the first potential Vcc_H, to the power supply lines DSL-1 through DSL-m in synchronization with the line sequential scanning by the writing and scanning circuit 104. In this way, the pixels 101 are controlled for light emission/non-emission.

The horizontal driving circuit 103 appropriately selects either one of the signal voltage Vsig of a video signal that depends on luminance information supplied from a signal supply source (not shown) and the signal line reference potential Vo, and writes to the pixels 101 of the pixel array section 102 via the signal lines DTL-1 through DTL-n, for example, on a row-by-row basis. That is, the horizontal driving circuit 103 employs a driving mode of line sequential writing, in which the signal voltage Vsig of the video signal is written on a row-by-row (line-by-line) basis.

In the present embodiment, a potential setting period is provided in which a potential provided to the power supply line DSL is set at the video signal reference potential Vo within a period from when the pixels 101 are turned off until the high potential Vcc_H is provided to the power supply line DSL. That is to say, the power supplying and scanning circuit 105 carries out, in addition to the switching between the first potential Vcc_H and the second potential Vcc_L, which is lower than the first potential Vcc_H, controlling of selecting the video signal reference potential Vo during the potential setting period.

In this way, the potential supplied to the video signal line DTL is not drawn into the anode potential Vcc_L even in the periods of from (F) to (I) in FIG. 9 to be at the video signal reference potential Vo, and it becomes possible to prevent the production of a luminance variation area regarding the previous pixels 101.

[Driving Method]

Figure 12:
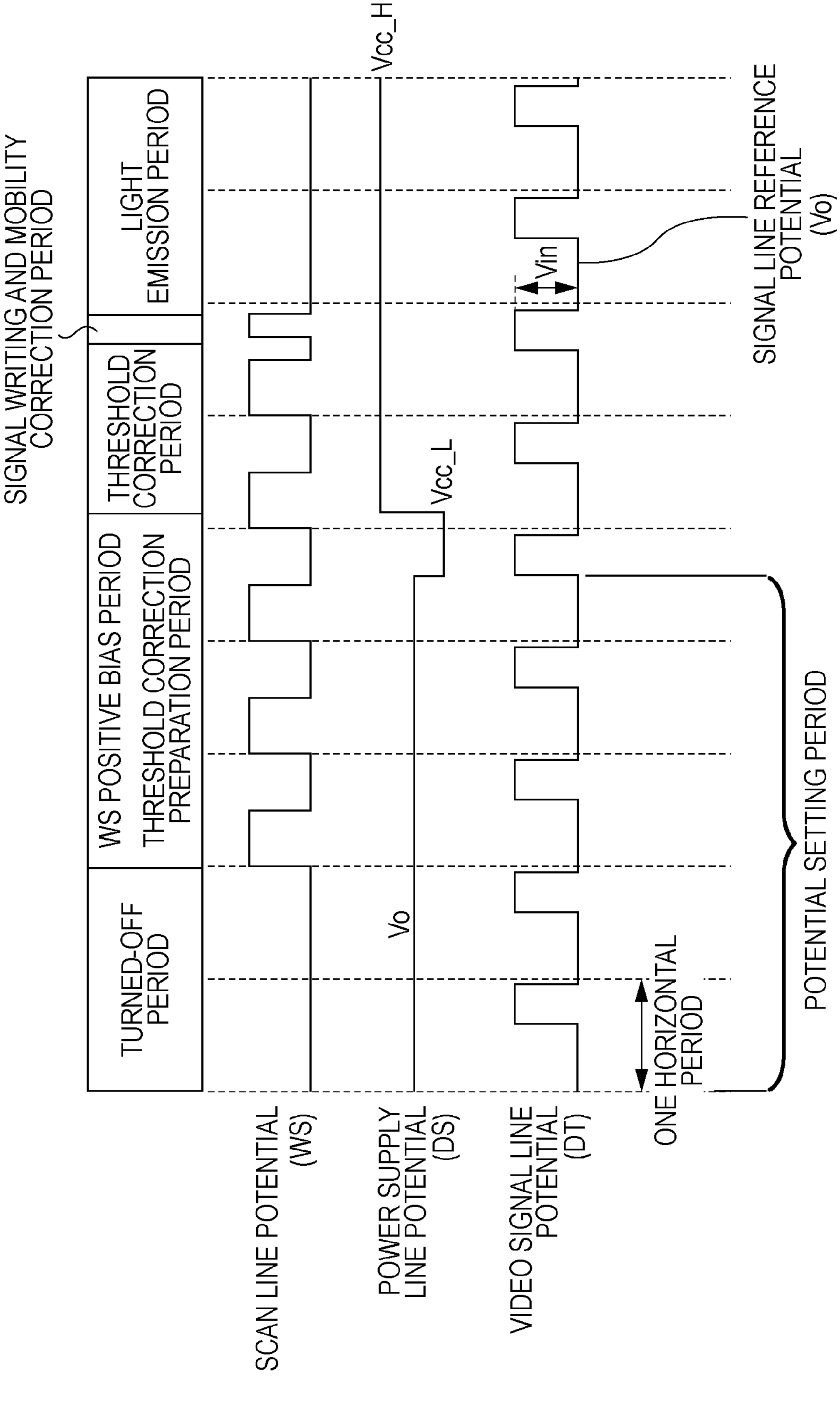
FIG. 12 is a timing waveform diagram illustrating a method of driving a display according to the present embodiment.

FIG. 12 is a timing waveform diagram illustrating a method of driving a display according to the present embodiment. The timing waveform diagram illustrated in FIG. 12 is, similar to the timing waveform diagram illustrated in FIG. 7, provided with a positive bias period and a threshold correction preparation period.

What is different in the timing waveform diagram illustrated in FIG. 12 from the timing waveform diagram illustrated in FIG. 7 is that a potential setting period is provided in which the potential DS of the power supply line DSL is set at the signal line reference potential Vo during the period from when the turned-off period starts until the threshold correction period starts.

That is, the positive bias period and the threshold correction preparation period are provided immediately before the threshold correction period (times t3 to t4) relative to the timings illustrated in FIG. 3, and the writing transistor 1A is positively biased. Here, the period while the power supply line DSL transits to the low potential becomes a non-emission (turned-off) period for the organic EL device 1D and enables to adjust the light emission period.

In the threshold correction preparation period, when the writing transistor 1A is positively biased, since the signal line reference potential Vo is supplied to the signal line DTL, the gate potential Vg of the driving transistor 1B becomes at the signal line reference potential Vo.

In the timing waveform diagram illustrated in FIG. 7, the potential Vcc_L, which is sufficiently lower than the signal line reference potential Vo, is applied to the power supply line DSL in the threshold correction preparation period, which makes the source potential Vs of the driving transistor 1B to be at the potential Vcc_L.

However, while the gate g of the driving transistor 1B and the anode s are electrically shorted in the pixel circuit as illustrated in FIG. 8A, the potential DT of the signal line DTL is drawn into Vcc_L, which is the source potential, if the writing transistor 1A is turned on in the threshold correction preparation period. In this way, a problem arises that Vn-4 to Vn-2, which are in front of the defective pixel Vn, increase in luminance during the periods of from (F) to (I) in FIG. 9 and are visually recognized as a luminance increase area in a line.

In the present embodiment, as illustrated in FIG. 12, a potential setting period is provided during the period from when the turned-off period starts until the threshold correction period starts and the potential DS of the power supply line DSL is set at the signal line reference potential Vo in the potential setting period. In this way, even while the gate g of the driving transistor 1B and the anode s are electrically shorted, the potential DT of the signal line DTL is not drawn into Vcc_L, which is the source potential, if the writing transistor 1A is turned on in the threshold correction preparation period, to be at the signal line reference potential Vo. Therefore, luminance increase is not produced in Vn-4 through Vn-2 in front of the defective pixel Vn.

The potential setting period is defined as from when the turned-off period starts until the middle of the threshold correction preparation period. That is to say, the potential WS of the scan line WSL transits to the low potential immediately before the threshold correction period starts, and once the writing transistor 1A becomes not conductive, the potential DS of the power supply line DSL is set at the low potential Vcc_L changed from the video signal reference potential Vo. In this way, the source potential Vs of the driving transistor 1B is initialized at the potential Vcc_L immediately before the threshold correction period starts.

Figure 13:
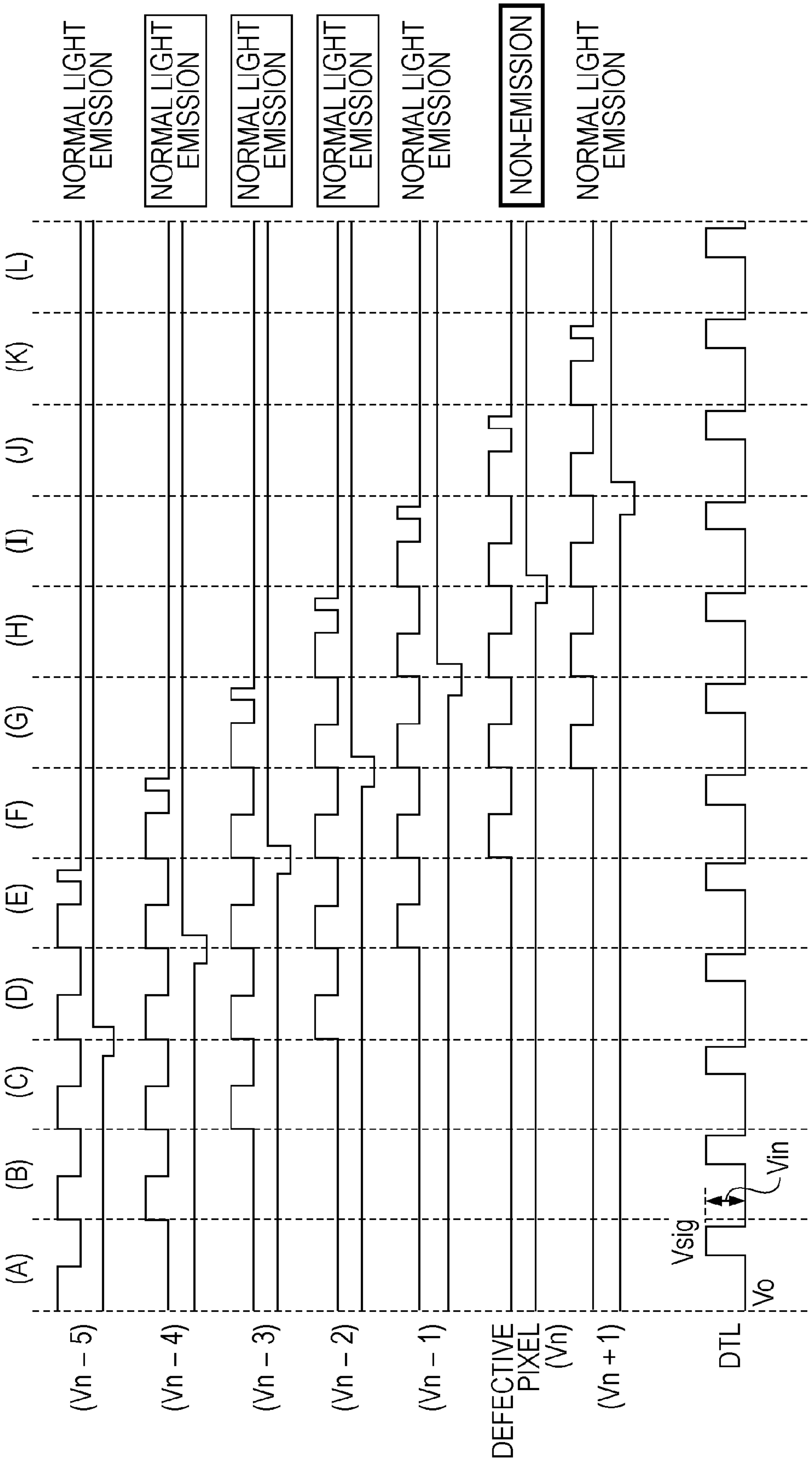
FIG. 13 is a timing waveform diagram illustrating pixel potential settings of a display according to the present embodiment.

FIG. 13 is a timing waveform diagram illustrating pixel potential settings of a display according to the present embodiment. In the present timing waveform diagram, Vn−5 through Vn+1 respectively illustrate the timings of the scan lines (upper line) and the power supply line potentials (lower line) for respective scanning line numbers. The defective pixel is equivalent to Vn. DTL illustrates the video signal potential.

The display of the present embodiment is provided with a potential setting period from when the turned-off period starts until the threshold correction period starts and the power supply line potential DS at a potential same as the video signal reference potential Vo. Therefore, even when there is a defective pixel in which the gate g of the driving transistor 1B and the anode s are electrically shorted, the video signal reference potential Vo is not drawn into a lower potential in the period of from (F) to (I) in FIG. 13. In this way, the luminance of Vn-4 through Vn-2 in front of the defective pixel Vn becomes normal in the period of from (F) to (I) in FIG. 13, and it becomes possible to prevent the production of the luminance increase area.

Since it is the condition for turning off that the low potential of the power supply line DSL becomes at the threshold of the organic EL device 1D or lower, the video signal reference potential Vo is also set within the range that meets the condition.

Although the above embodiment is described with an exemplary case of application to an organic EL display using an organic EL device as an electro-optical device for the pixels 101, embodiments of the present invention are not limited to such an application example and it is possible to apply to displays using a current driven electro-optical device (light emitting element) in general whose light emission luminance changes in response to the value of current flowing in a device.

Although a case of a pixel configuration of 2Tr/1C, which includes two transistors (Tr) and one capacitive element (C) as a configuration of the pixels 101, is cited as an example, embodiments of the present invention are not limited to it and it is also possible to apply to other pixel configurations, such as a pixel configuration of 4Tr/1C including four transistors (Tr) and one capacitive element (C).

<4. Application Examples>

The display according to the present embodiment described above is applied to various electronic devices, including those illustrated in FIGS. 14 to 18G cited as examples only. It is possible to apply to displays of electronic devices in any field that display a video signal input to electronic devices or a video signal generated in an electronic device as an image or a video, such as digital cameras, notebook-sized personal computers, mobile terminal devices including mobile phones and the like, and video cameras.

In such a manner, since the image quality of display images can be improved by using a display according to the present embodiment as a display for an electronic device in any field, there is an advantage that image display of good quality can be carried out in various electronic devices.

A display according to the present embodiment may be formed as a module with a sealed configuration. An example is a display module formed by bonding a facing portion made of transparent glass to the pixel array section 102. On the transparent facing portion, a color filter, a protective film, and the shading film mentioned above may be provided. The display module may also be provided with a circuit part to externally input and output signals to the pixel array section, a flexible printed circuit (FPC), and the like.

A description is given below to specific examples of electronic devices to which the display of the present embodiment is applied.

Figure 14:
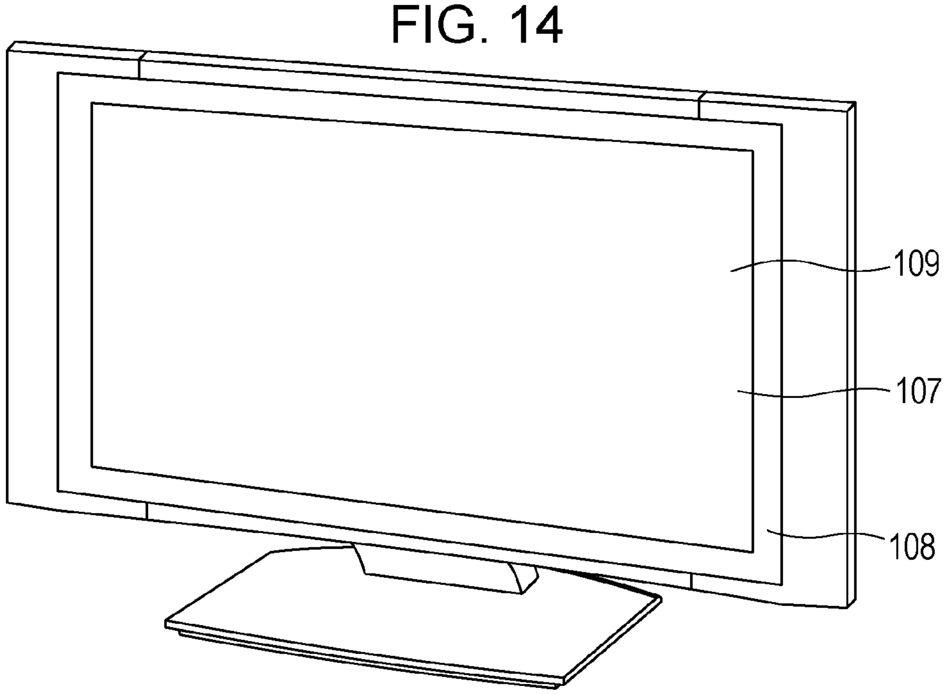
FIG. 14 is a perspective view illustrating an appearance of a television set to which the present embodiment is applied.

FIG. 14 is a perspective view illustrating an appearance of a television set to which the present embodiment is applied. The television set according to the application example includes a video display unit 107 configured with a front panel 108, a filter glass 109, and the like, and is fabricated by using a display according to the present embodiment for the video display unit 107.

Figure 15A:
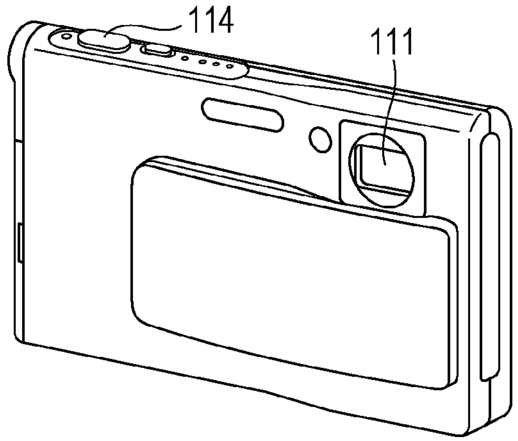
FIGS. 15A and 15B are perspective views illustrating appearances of a digital camera to which the present embodiment is applied.
Figure 15B:
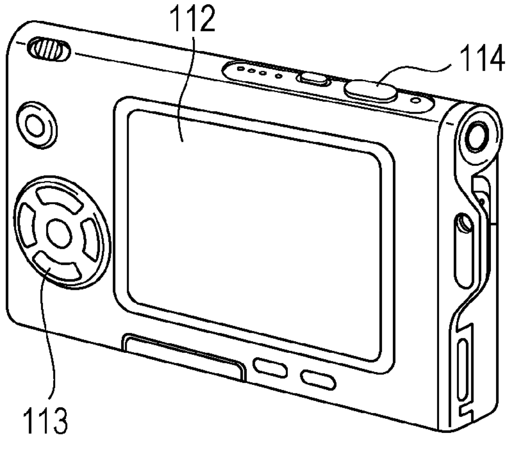

FIGS. 15A and 15B are perspective views illustrating appearances of a digital camera to which the present embodiment is applied; FIG. 15A is a perspective view taken from the front and FIG. 15B is a perspective view taken from the back. The digital camera according to the present application example includes a light emission unit 111 for a flashlight, a display unit 112, a menu switch 113, a shutter button 114, and the like, and is fabricated by using a display according to the present embodiment for the display unit 112.

Figure 16:
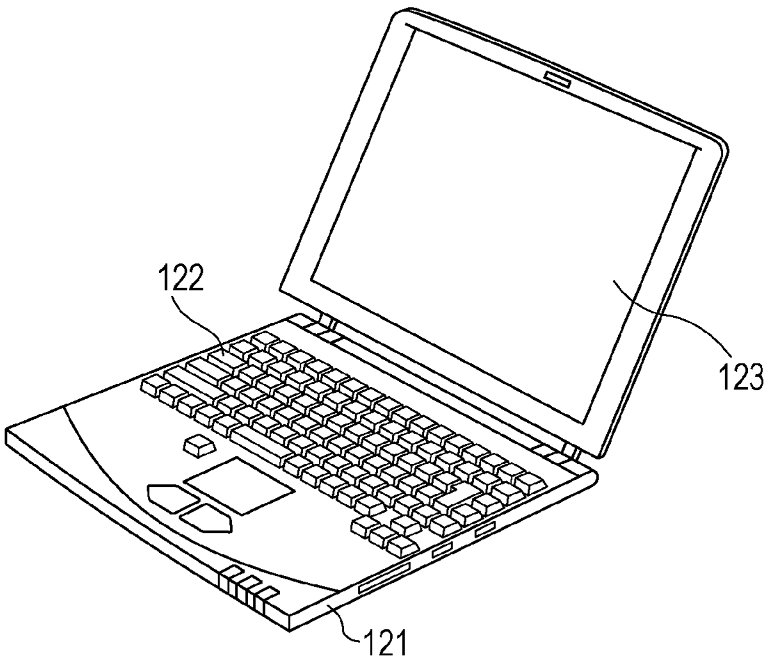
FIG. 16 is a perspective view illustrating an appearance of a notebook-sized personal computer to which the present embodiment is applied.

FIG. 16 is a perspective view illustrating an appearance of a notebook-sized personal computer to which the present embodiment is applied. The notebook-sized personal computer according to the present application example has a main body 121 including a keyboard 122 to be operated when inputting a character and the like, a display unit 123 to display an image, and the like, and is fabricated by using a display according to the present embodiment for the display unit 123.

Figure 17:
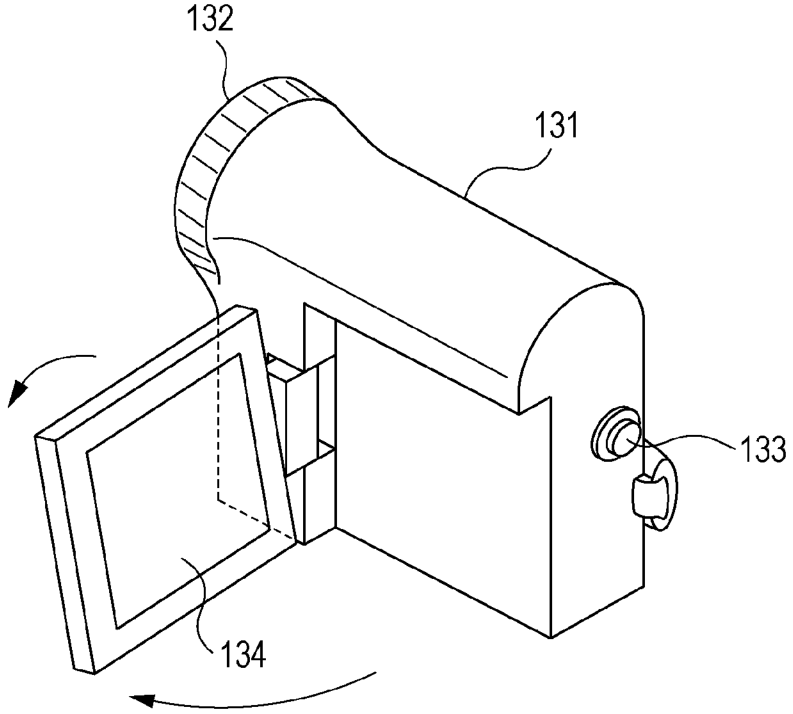
FIG. 17 is a perspective view illustrating an appearance of a video camera to which the present embodiment is applied.

FIG. 17 is a perspective view illustrating an appearance of a video camera to which the present embodiment is applied. The video camera according to the present application example includes a main body 131, a lens 132 for taking a subject provided on a side face that can be directed forwardly, a start/stop switch 133 while taking a video, a display unit 134, and the like, and is fabricated by using a display according to the present embodiment for the display unit 134.

Figure 18E:
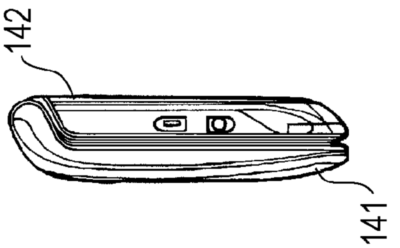
FIGS. 18A to 18G are external views illustrating a mobile phone to which the present embodiment is applied.
Figure 18F:
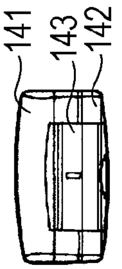
Figure 18C:
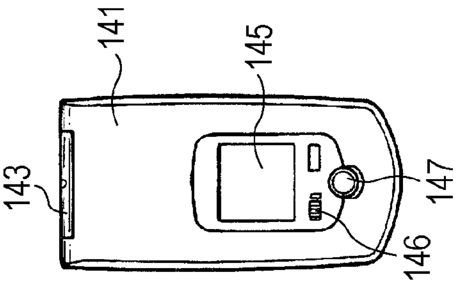
Figure 18G:
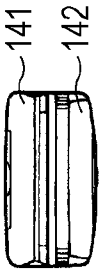
Figure 18D:
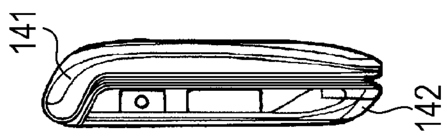
Figure 18B:
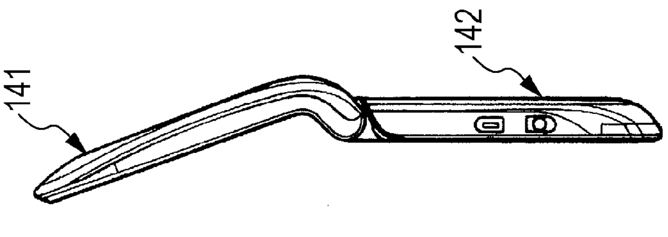
Figure 18A:
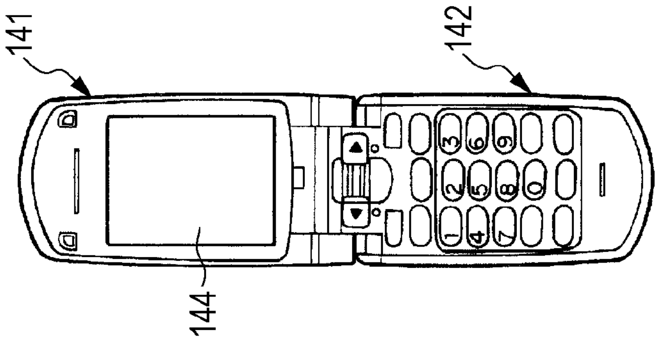

FIGS. 18A to 18G are external views illustrating a mobile terminal device, such as a mobile phone, to which the present embodiment is applied; FIG. 18A is a front view in an open state, FIG. 18B is a side view thereof, FIG. 18C is a front view in an closed state, FIG. 18D is a left side view, FIG. 18E is a right side view, FIG. 18F is a top view, and FIG. 18G is a bottom view. The mobile phone according to the present application example includes an upper housing 141, a lower housing 142, a connection unit (a hinge, in this example) 143, a display 144, a sub-display 145, a picture light 146, a camera 147, and the like, and is fabricated by using a display according to the present embodiment for the display 144 and the sub-display 145.

The present application contains subject matter related to that disclosed in Japanese Priority Patent Application JP 2008-315466 filed in the Japan Patent Office on Dec. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:

a pixel array section having pixels arranged in a matrix, each pixel including a circuit configuration in which an anode electrode of an organic EL (Electro Luminescent) device and a source electrode of a driving transistor are interconnected, a gate electrode of the driving transistor and a source electrode or a drain electrode of a writing transistor are interconnected, and a storage capacitor is connected between the gate and source electrodes of the driving transistor;

scan lines wired for respective pixel rows of the pixel array section and providing a scanning signal to a gate electrode of the writing transistor;

power supply lines wired for respective pixel rows of the pixel array section and selectively providing a first potential and a second potential lower than the first potential to a drain electrode of the driving transistor; and signal lines arranged for respective pixel columns of the pixel array section and selectively providing a video signal and a video signal reference potential to the drain electrode or the source electrode of the writing transistor, wherein, a potential setting period is provided in which a potential provided to a power supply line is set at the video signal reference potential within a period from when the organic EL device of the pixels is turned off until the first potential is provided to the power supply line, a threshold correction period is provided in which the video signal reference potential is provided to a signal line while the scanning signal is provided to a scan line within a period of driving a previous pixel row so as to carry out threshold correction of the driving transistor in a pixel currently being processed, a threshold correction preparation period is provided in which a potential of the source electrode of the driving transistor is set at the second potential from when the organic EL device of the pixels is turned off until the threshold correction period starts, and the potential setting period is provided from when a turned-off state starts until the middle of the threshold correction preparation period.

2. The display according to Claim 1, wherein the first potential is provided to the power supply line immediately before the threshold correction period starts.

3. A display comprising:

a pixel array section having pixels arranged in a matrix, each pixel including an electro-optical device, a writing transistor writing a video signal, a storage capacitor retaining the video signal written by the writing transistor, and a driving transistor driving the electro-optical device based upon the video signal retained in the storage capacitor;

scan lines wired for respective pixel rows of the pixel array section and providing a scanning signal to the writing transistor;

power supply lines wired for respective pixel rows of the pixel array section and selectively providing a first potential and a second potential lower than the first potential to a drain electrode of the driving transistor; and signal lines arranged for respective pixel columns of the pixel array section and selectively providing the video signal and a video signal reference potential to the writing transistor, wherein,.

a potential setting period is provided in which a potential provided to a power supply line is set at the video signal reference potential within a period from when the pixels are turned off until the first potential is provided to the power supply line, a threshold correction period is provided in which the video signal reference potential is provided to a signal line while the scanning signal is provided to a scan line within a period of driving a previous pixel row so as to carry out threshold correction of the driving transistor in a pixel currently being processed, a threshold correction preparation period is provided in which a potential of the source electrode of the driving transistor is set at the second potential from when the electro-optical device of the pixels is turned off until the threshold correction period starts, and the potential setting period is provided from when a turned-off state starts until the middle of the threshold correction preparation period.

4. A method of driving a display, the display including:

a pixel array section having pixels arranged in a matrix, each pixel including a circuit configuration in which an anode electrode of an organic EL (Electro Luminescent) device and a source electrode of a driving transistor are interconnected, a gate electrode of the driving transistor and a source electrode or a drain electrode of a writing transistor are interconnected, and a storage capacitor is connected between the gate and source electrodes of the driving transistor;

scan lines wired for respective pixel rows of the pixel array section and providing a scanning signal to a gate electrode of the writing transistor;

power supply lines wired for respective pixel rows of the pixel array section and selectively providing a first potential and a second potential lower than the first potential to a drain electrode of the driving transistor; and signal lines arranged for respective pixel columns of the pixel array section and selectively providing a video signal and a video signal reference potential to the drain electrode or the source electrode of the writing transistor, wherein, the method comprises (a) providing a potential setting period in which a potential provided to a power supply line is set at the video signal reference potential within a period from when the organic EL device of the pixels is turned off until the first potential is provided to the power supply line, (b) providing a threshold correction period in which the video signal reference potential is provided to a signal line while the scanning signal is provided to a scan line within a period of driving a previous pixel row so as to carry out threshold correction of the driving transistor in a pixel currently being processed, and (c) providing a threshold correction preparation period in which a potential of the source electrode of the driving transistor is set at the second potential from when the organic EL device of the pixels is turned off until the threshold correction period starts, and the potential setting period is provided from when a turned-off state starts until the middle of the threshold correction preparation period.

5. An electronic device, comprising a display in a main body housing, wherein:

(1) the display includes (a) a pixel array section having pixels arranged in a matrix, each pixel including a circuit configuration in which an anode electrode of an organic EL (Electro Luminescent) device and a source electrode of a driving transistor are interconnected, a gate electrode of the driving transistor and a source electrode or a drain electrode of a writing transistor are interconnected, and a storage capacitor is connected between the gate and source electrodes of the driving transistor;

(b) scan lines wired for respective pixel rows of the pixel array section and providing a scanning signal to a gate electrode of the writing transistor;

(c) power supply lines wired for respective pixel rows of the pixel array section and selectively providing a first potential and a second potential lower than the first potential to a drain electrode of the driving transistor; and (d) signal lines arranged for respective pixel columns of the pixel array section and selectively providing a video signal and a video signal reference potential to the drain electrode or the source electrode of the writing transistor;

(2) a potential setting period is provided in which a potential provided to a power supply line is set at the video signal reference potential within a period from when the organic EL device of the pixels is turned off until the first potential is provided to the power supply line;

(3) a threshold correction period is provided in which the video signal reference potential is provided to a signal line while the scanning signal is provided to a scan line within a period of driving a previous pixel row so as to carry out threshold correction of the driving transistor in a pixel currently being processed;

(4) a threshold correction preparation period is provided in which a potential of the source electrode of the driving transistor is set at the second potential from when the organic EL device of the pixels is turned off until the threshold correction period starts and (5) the potential setting period is provided from when a turned-off state starts until the middle of the threshold correction preparation period.

* * * * *